(12) United States Patent
Terborn et al.

(10) Patent No.: US 6,431,557 B1
(45) Date of Patent: Aug. 13, 2002

(54) DRIVING MODE RIDE HEIGHT ADJUSTMENT

(75) Inventors: Bengt Terborn, Askim; Per-Olof Brandt, Kållered, both of (SE)

(73) Assignee: Volvo Lastvagnar AB (SE)

( * ) Notice: Subject to any disclaimer, the term of this patent is extended or adjusted under 35 U.S.C. 154(b) by 0 days.

(21) Appl. No.: 09/341,828

(22) PCT Filed: Jan. 22, 1998

(86) PCT No.: PCT/SE98/00091

§ 371 (c)(1),
(2), (4) Date: Jul. 19, 1999

(87) PCT Pub. No.: WO98/35845

PCT Pub. Date: Aug. 20, 1998

(30) Foreign Application Priority Data

Jan. 24, 1997 (SE) .............................................. 9700193

(51) Int. Cl.$^7$ .......................... B60G 17/01; B60G 17/05
(52) U.S. Cl. ................ 280/6.15; 280/6.157; 280/6.159; 280/5.507
(58) Field of Search ............................ 280/6.15, 6.153, 280/6.154, 6.151, 6.157, 6.11, 6.12, 6.1, 5.51, 5.507, 5.514, 124.157, 6.16, 6.159, 5.54

(56) References Cited

U.S. PATENT DOCUMENTS

| | | | | |
|---|---|---|---|---|
| 3,049,362 A | * | 8/1962 | Chambers | 280/6.15 |
| 3,064,994 A | * | 11/1962 | Limmer | 280/6.15 |
| 4,335,901 A | * | 6/1982 | Gladish | 280/6.15 |
| 4,558,886 A | * | 12/1985 | Straub | 280/6.15 |
| 4,647,069 A | | 3/1987 | Iijima | 280/5.514 |
| 4,744,589 A | | 5/1988 | Buma et al. | 280/707 |
| 4,807,713 A | * | 2/1989 | Smith et al. | 280/6.15 |
| 4,836,578 A | * | 6/1989 | Soltis | 280/6.15 |
| 4,865,349 A | * | 9/1989 | Church, Jr. | 280/6.15 |
| 4,923,210 A | * | 5/1990 | Heider et al. | 280/6.153 |
| 4,993,729 A | * | 2/1991 | Payne | 280/81.1 |
| 5,269,558 A | * | 12/1993 | Yoshioka et al. | 280/5.5 |
| 5,273,308 A | | 12/1993 | Griffiths | |
| 5,344,189 A | | 9/1994 | Tanaka et al. | 280/840 |
| 5,388,857 A | * | 2/1995 | Werimont et al. | 280/6.15 |
| 5,684,698 A | | 11/1997 | Fujii et al. | 364/424.047 |
| 5,839,741 A | | 11/1998 | Heyring | 280/124.106 |
| 5,890,721 A | * | 4/1999 | Schneider et al. | 280/6.154 |
| 6,098,994 A | * | 8/2000 | Kunishima et al. | 280/5.5 |
| 6,161,845 A | | 12/2000 | Shono et al. | 280/6.15 |
| 6,168,171 B1 | | 1/2001 | Shono et al. | 280/5.507 |

FOREIGN PATENT DOCUMENTS

| | | |
|---|---|---|
| DE | 42 30 249 A1 | 3/1994 |
| WO | 91/07291 A1 | 5/1991 |
| WO | 95/05292 A1 | 2/1995 |

\* cited by examiner

*Primary Examiner*—Paul N. Dickson
*Assistant Examiner*—Hau Phan
(74) *Attorney, Agent, or Firm*—Lerner, David, Littenberg, Krumholz & Mentlik, LLP

(57) ABSTRACT

Apparatus for adjusting the height of a vehicle frame on a vehicle is disclosed including a pneumatic suspension system for adjusting the elevation of the vehicle frame, and a controller for controlling the pneumatic suspension system, the controller being adapted to be set in a first mode corresponding to normal driving of the vehicle and a second mode corresponding to parking or marshalling of the vehicle, whereby when the controller is in the first mode, the pneumatic suspension system permits adjustment of the vehicle frame within a first range and when the controller is in the second mode the pneumatic suspension system permits adjustment of the vehicle frame within the second range, the first range being greater than the second range, and the second range being within the first range.

16 Claims, 7 Drawing Sheets

DRIVING MODE RIDE HEIGHT ADJUSTMENT

FIELD OF THE INVENTION

The present invention relates to an apparatus for adjusting the driving mode ride height of a vehicle having a pneumatic suspension system.

BACKGROUND OF THE INVENTION

When load-carrying vehicles (LCV's) are to be loaded and unloaded, they are normally brought to a loading dock. In order to facilitate and to increase the efficiency of such loading and unloading, the height of the loading dock should be adapted to the elevation of the loading platform of the LCV. One way of achieving this result is to construct a loading dock having a variable elevation. Such an approach may be economically feasible with highly utilized loading docks, such as goods terminals, where loading and unloading are very frequent.

Another method of solving the problem of adapting the height of the loading dock and the elevation of the LCV loading platform is to control the elevation of the vehicle loading platform. Such an approach has the advantage of allowing for adaptation to loading docks having a fixed height.

Such a system is described, for example, in British Patent No. 2,237,780.

This patent describes a system in which the LCV loading platform is located at a predetermined height when the vehicle is operated in its normal driving mode. When the vehicle is parked for loading and unloading, however, the elevation of the LCV loading platform is adjustable so as to allow for adaptation of its elevation to the height of the loading dock, thus enabling efficient loading and unloading. When the LCV is to once again be operated in a normal driving mode, the original fixed elevation of the LCV loading platform is restored.

PCT Application No. WO 91/07291 discloses another apparatus of the type disclosed above.

One problem exhibited by the prior art is that the height assumed by the LCV loading platform, when restoring the elevation of the LCV loading platform for normal operation of the LCV, after performing height adjustment during loading and unloading, is fixed and cannot be varied. Therefore, when the vehicle is operated in a normal driving mode, i.e. when the vehicle is not parked or is driven at a speed exceeding a relatively low speed, the elevation of the LCV loading platform in most cases cannot be adjusted, and in those cases where the elevation is adjustable, it is adjustable within the same range as the permitted range for loading and unloading. This initially means that control possibilities are not available, which is a disadvantage with this type of prior art, and secondly that the ride height in the driving mode is adjustable within a range where a risk of damage to the load and the LCV exists.

It has been determined by tests and calculations that the aerodynamic properties of an LCV are dependent on the elevation of the LCV loading platform. Such tests and calculations have shown that is preferable, for obtaining an LCV having a lower air resistance, and thus a lower fuel consumption, for the elevation of the LCV loading platform to be as low as possible when the vehicle is operated in a driving mode.

Thus, it is an object of the present invention, by providing the LCV with a possibility of adjusting the elevation of the LCV loading platform, to permit the vehicle to be operated in the driving mode with a low set driving mode elevation or ride height, thereby reducing both the air resistance and the fuel consumption.

A second advantage of being able to lower the elevation of the LCV loading platform is, in those cases where the absolute height of the LCV is limited by regulations or accessibility, that a larger loading height can be utilized, thereby improving the financial strength of the LCV.

Thus, another object of the present invention is, by providing the LCV with a mechanism to control the height of the loading platform, to ensure that the LCV can be driven with a low ride height, whereas the LCV can carry further load, which improves the economy for the LCV.

A further advantage of being able to lower the ride height of the LCV framework is that this lowers the cab instep height which increases driver comfort.

Thus, it is another object of the present invention, by providing the LCV with the ability of adjusting the ride height of the LCV framework, and thereby that of its loading platform and cab, which are affixed to the framework, to lower the cab instep height thereby increasing driver comfort.

An LCV loading platform is resiliently suspended by the structure carrying wheel axles and wheels. Thus, when the LCV is operated in the driving mode, the LCV loading platform will oscillate around the height level that the loading platform has assumed in an equilibrium position, when standing still. The amplitude of loading platform oscillations around its equilibrium position is dependent of the quality of the road, the load weight, the vehicle speed, and the characteristics of the loading platform suspension.

As discussed above, the loading platform of an LCV is fitted to the wheel-carrying structure by resilient means. Such resilient means display elastic properties within a certain range of expansion and compression. If the resilient means are compressed excessively, they will then act like a rigid connection. Such excessive compression will occur if the loading platform has been adjusted to an excessively low position when the LCV is operated in a driving mode. This means that the harmonic oscillation which, when the loading platform elevation is correctly adjusted, occurs around the equilibrium position of the loading surface height level, is replaced by an interrupted oscillation when the resilient means is compressed past its elastic range. When interrupted oscillatory motions take place, large accelerations occur, leading to the load, the resilient means, and the LCV as a whole, being subjected to very high stress forces. If the loading platform is adjusted to an excessively high position, problems will also occur, in that the resilient means may be extended in excess of the elastic range. In such cases, an interrupted oscillatory motion also occurs leading to high stress forces on the load, the resilient means, and on the LCV as a whole.

Yet another object of the present invention is to provide the LCV with a means of adjusting the elevation of its loading platform, thus allowing for adjustment within a first, larger range when the vehicle has taken up a parking or marshalling position, and adjustment within a second, smaller range when the vehicle has taken up a driving mode. Adjustment of the ride height will thus be allowed when the vehicle is in a driving mode, but the elevation or ride height in this mode can only be adjusted within a range which is not detrimental to either the load or the vehicle.

One advantage of allowing the ride height of the vehicle framework and loading platform to be adjusted to as high a level as possible is that the framework ground clearance increases. This is of importance when the vehicle is driven over bad ground and when the vehicle is driven across angled ramps and steep structures.

Still another object of the present invention is, by providing the LCV with a means of adjusting the elevation of the vehicle framework and loading platform, that the driver will be able to selectively adjust the ride height in accordance with various conditions. Thus, if the vehicle is to be driven on a flat road as low a ride height as possible is of interest, or if the vehicle is driven over bad ground or across steep ramps and structures, as high a ride height as possible is of interest.

A still further advantage of having the vehicle framework and loading platform adjustable within a first, larger range when the vehicle has taken up a parking or marshalling position and a second smaller range when the vehicle has taken up a driving mode is that the vehicle cardan shaft, which is provided for connecting an output shaft of a transmission arranged in the vehicle to a driving wheel axle, is connected to the driving wheel axle in a certain angular position. When the vehicle is standing still or being driven at low speed, a relatively large deviation from this position is allowable. When the vehicle is driven at a higher speed, only a smaller deviation from this angular position is allowable. As the cardan shaft is carried by the same structure that carries the vehicle loading platform, that is the vehicle framework or frame structure, the elevation of the framework, the frame structure, or the loading platform, must only be adjustable within a smaller range when in the driving mode.

It is also an object of the present invention by providing the LCV with a means of adjusting the elevation of its loading platform, thus allowing adjustment within a first, larger range when the vehicle has taken up a parking or marshalling position, and within a second smaller range when the vehicle has taken up a driving mode to allow adjustment of the ride height when the vehicle is in the driving mode, at the same time allowing the ride height only to be adjusted within a range that is not detrimental to the cardan shaft and its suspension.

SUMMARY OF THE INVENTION

In accordance with the present invention, these and other objects have now been realized by the invention of apparatus for adjusting the height of a vehicle frame on a vehicle including a vehicle suspension system, the apparatus comprising vehicle frame elevation adjustment means for adjusting the elevation of the vehicle frame, and control means for controlling the vehicle frame elevation adjustment means, the control means adapted to be set in a first mode corresponding to normal driving of the vehicle and a second mode corresponding to parking or marshalling of the vehicle, whereby when the control means is in the first mode the vehicle frame elevation adjustment means permits adjustment of the vehicle frame within a first range and when the control means is in the second mode the vehicle frame elevation adjustment means permits adjustment of the vehicle frame within a second range, the first range being greater than the second range, and the second range being within the first range.

In a preferred embodiment, the vehicle frame elevation adjustment means comprises a pneumatic suspension system for the vehicle. Preferably, the vehicle includes at least one wheel axle, and the vehicle frame elevation adjustment means adjusts the elevation of the vehicle frame with respect to the at least one wheel axle.

In accordance with a preferred embodiment of the apparatus of the present invention, the pneumatic suspension system is arranged between the vehicle frame and the at least one wheel axle, the control means including selector means for selecting one of the first and second modes, and the pneumatic suspension system including a source of compressed air, valve means for selectively feeding the compressed air to the pneumatic suspension system or drawing the compressed air from the pneumatic suspension system in response to the control means, whereby the pneumatic suspension system is expanded or compressed in order to adjust the distance between the vehicle frame and the at least one wheel axle, the distance between the vehicle frame and the at least one wheel axle being adjusted within the first range when the control means is in the first mode and within the second range when the control means is in the second mode. Preferably, the apparatus includes measuring means for measuring the distance between the vehicle frame and the at least one wheel axle.

In accordance with one embodiment of the apparatus of the present invention, the measuring means comprises an angular position sensor, a lever connected to the angular position sensor, and a control rod articulated with respect to the lever, the angular position sensor being attached to one of the vehicle frame and the at least one wheel axle and the control rod being attached to the other of the vehicle frame and the at least one wheel axle, whereby the angular position sensor measures the angular position of the lever so that when the distance between the vehicle frame and the at least one wheel axle is altered by means of the pneumatic suspension system the position of the control rod is altered, thereby altering the angular position of the lever sensed by the angular position sensor, the control means including means for reading the angular position of the lever and determining the distance between the vehicle frame and the at least one wheel axle based thereon.

In accordance with a preferred embodiment of the apparatus of the present invention, the pneumatic suspension system includes air bellows comprising a flexible material, a base for the air bellows, and a top for the air bellows, the air bellows, the base and the top defining a closed space, and passage means connecting the valve means with the closed space, the pneumatic suspension system including a cylindrical surface, whereby the bellows is adapted to roll onto the cylindrical surface when the pneumatic suspension system is compressed and to roll off of the cylindrical surface when the pneumatic suspension system is extended. Preferably, the cylindrical surface is incorporated in the base, and the base is attached to the at least one wheel axle. In a preferred embodiment, the cylindrical surface comprises a hollow body, whereby the volume of the closed space is increased.

In accordance with one embodiment of the apparatus of the present invention, the apparatus includes selector means connected to the control means, the selector means being manually settable between the first mode and the second mode.

In accordance with another embodiment of the apparatus of the present invention, the apparatus includes vehicle speed detection means for detecting the speed of the vehicle, whereby the control means is set in the first mode when the speed of the vehicle is greater than a predetermined speed and the control means is set in the second mode when the speed of the vehicle is below the predetermined speed. Preferably, the predetermined speed is 0 km/hour, and in another embodiment the predetermined speed is 20 km/hour.

In accordance with another embodiment of the apparatus of the present invention, the limits of the first range are defined by the maximum extension and compression of the pneumatic suspension system.

In accordance with another embodiment of the apparatus of the present invention, the vehicle includes a cardan shaft, and the limits of the second range are defined by the maximum and minimum angle of the cardan shaft and by a required upward and downward suspension stroke.

In accordance with the present invention, apparatus has also been provided for adjusting the distance between a vehicle frame and at least one wheel axle of a vehicle having a suspension system, the apparatus comprising a control unit including control members for setting a desired value for the distance, control means adapted to be set in a first mode and a second mode, and selector means for selecting one of the first and second modes for the control means whereby when the control means is in the first mode the desired value for the distance is within a first range and when the control means is in the second mode the desired value for the distance is within a second range, the first range being greater than the second range, and the second range being within the first range. In a preferred embodiment, the vehicle includes a cab and wherein the control means is attachably mounted in the cab.

In accordance with one embodiment of the apparatus of the present invention, the first mode corresponds to normal driving of the vehicle and the second mode corresponds to parking or marshalling of the vehicle. In another embodiment, the selector means comprises a manual switch.

In order to achieve the above objects of the present invention, apparatus is thus provided for adjustment of the driving mode elevation of a vehicle, where the vehicle elevation is adjustable within a second, smaller range when the control device has taken up its driving mode, the second smaller range lying within the first, larger range for the parking or marshalling mode.

In one embodiment of the present invention, pneumatic suspension means arranged on the vehicle are utilized as the means changing the height level of the vehicle for adjustment of the distance between the wheel axle of the vehicle and the vehicle load-carrying structure, and thereby the elevation of the vehicle loading platform. According to these embodiments, mounting of further height regulation means are avoided which is space, weight and resource saving.

In one embodiment of the present invention, measuring means are used for determination of a measurement of the distance between the wheel axle and the load-carrying structure, which means that a more exact control of the elevation of the frame structure and the loading platform can be achieved.

According to another embodiment of the present invention, a control unit is provided for adjustment of the distance between a load-carrying structure and at least one wheel axle of a vehicle, where the distance is adjustable within a first, larger range when an integral control device in the vehicle has taken up its parking or marshalling mode, and the vehicle ride height is adjustable within a second, smaller range when the control device has taken up its driving mode, the second smaller range lying within the first, larger range.

"Driving mode ride height" refers to the elevation of the loading platform when the LCV is operated in the driving mode.

BRIEF DESCRIPTION OF THE DRAWINGS

The present invention will be described in greater detail below with reference to the following detailed description, which in turn refers to the drawings, in which.

DETAILED DESCRIPTION

Figure 1:
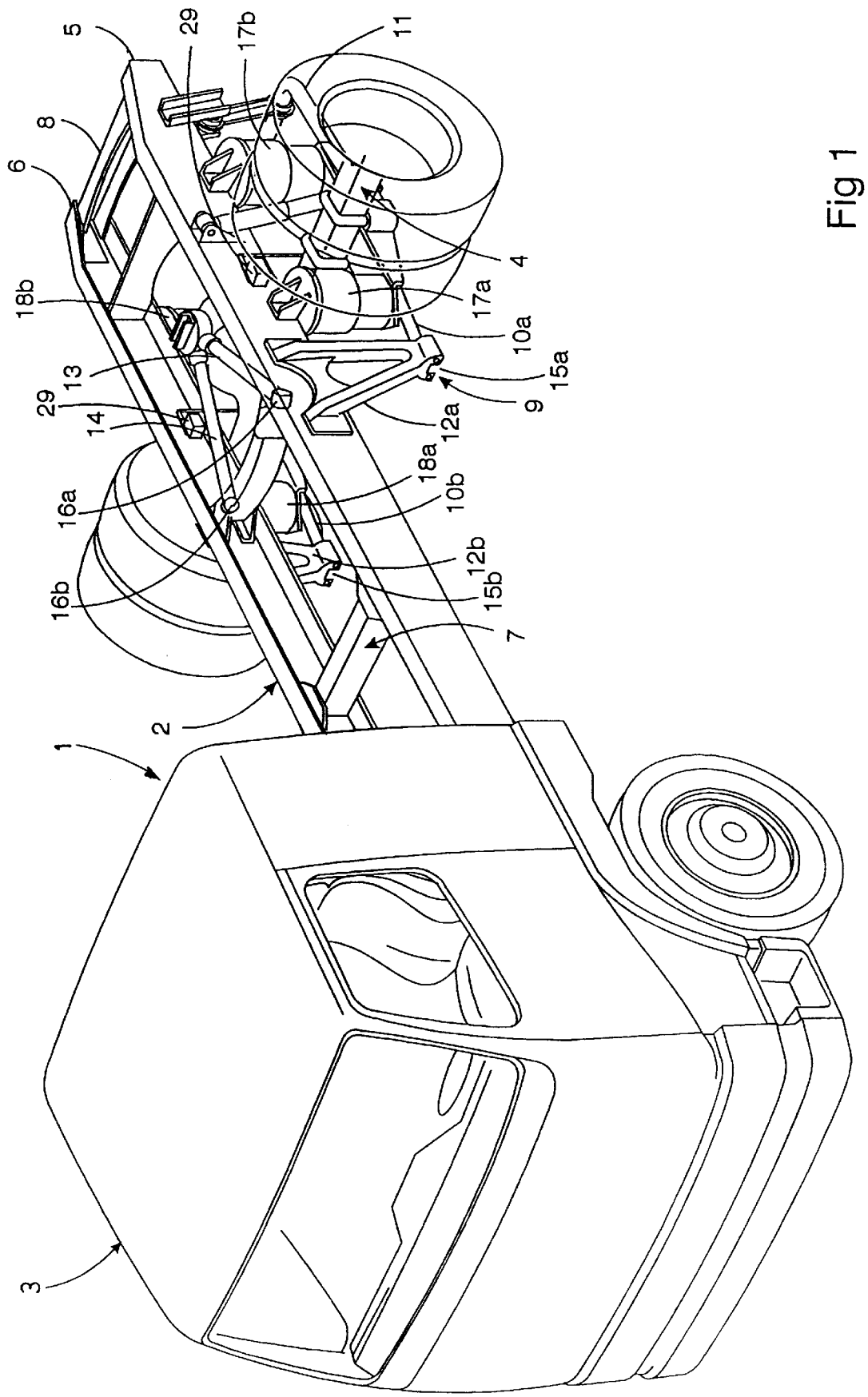
FIG. 1 is a front, perspective, partially schematic view of an LCV.

Turning to the drawings, in which like reference numerals refer to like elements thereof, FIG. 1 shows, schematically, an LCV 1. The vehicle shown in the figure is a tractor vehicle. The invention may, however, be utilized on a tractor vehicle as well as on a trailer. The LCV 1 is constructed around a frame structure 2 which is intended to carry the cab 3 of the LCV, as well as other vehicle apparatus, the LCV front axle (not shown) and the LCV rear axle 4. The frame structure is also intended for supporting the load-carrying structure of the LCV.

According to the present invention, the load-carrying structure is preferably comprised of a planar loading platform, as the present invention is particularly advantageous for use in connection with vehicles equipped with loading height level adjustment for the facilitation of loading and unloading. It is possible, however, to utilize some other type of load-carrying structure, such as an upper body, a container transportation device, or a tank body.

The frame structure is mainly comprised of two longitudinal girders, 5 and 6, connected by a number of transversal girders, 7 and 8.

The front axle is suspended by a (not shown) wheel axle suspension.

The rear axle 4 is suspended by a wheel axle suspension 9.

The wheel axle suspension, which is of a conventional type, is comprised of longitudinal stays, 10a and 10b, one on each side of the vehicle, which are affixed to the wheel axle 4, one transverse stay 11 that connects the two longitudinal stays, 10a and 10b, vertical V-shaped brackets, 12a and 12b, connecting the longitudinal stays to the LCV frame structure, and diagonal stays, 13 and 14, connecting a central portion of the wheel axis 4 to the frame structure 2. These stays/brackets ascertain that the wheel axle is fixed longitudinally and transversally relative to the vehicle. However, the wheel axle is movable around the pivot points, 15a, 15b, 16a, and 16b, around which an axle parallelogram is formed by the longitudinal stays, 10a and 10b, and the diagonal stays, 13 and 14. The suspension of the wheel axle by these stays means that the wheel axle is movable along an arcuate path. In the area around the normal height level position of the wheel axle relative to the frame structure, the wheel axle moves principally in a plane perpendicular to the extension of the girders.

Figure 2:
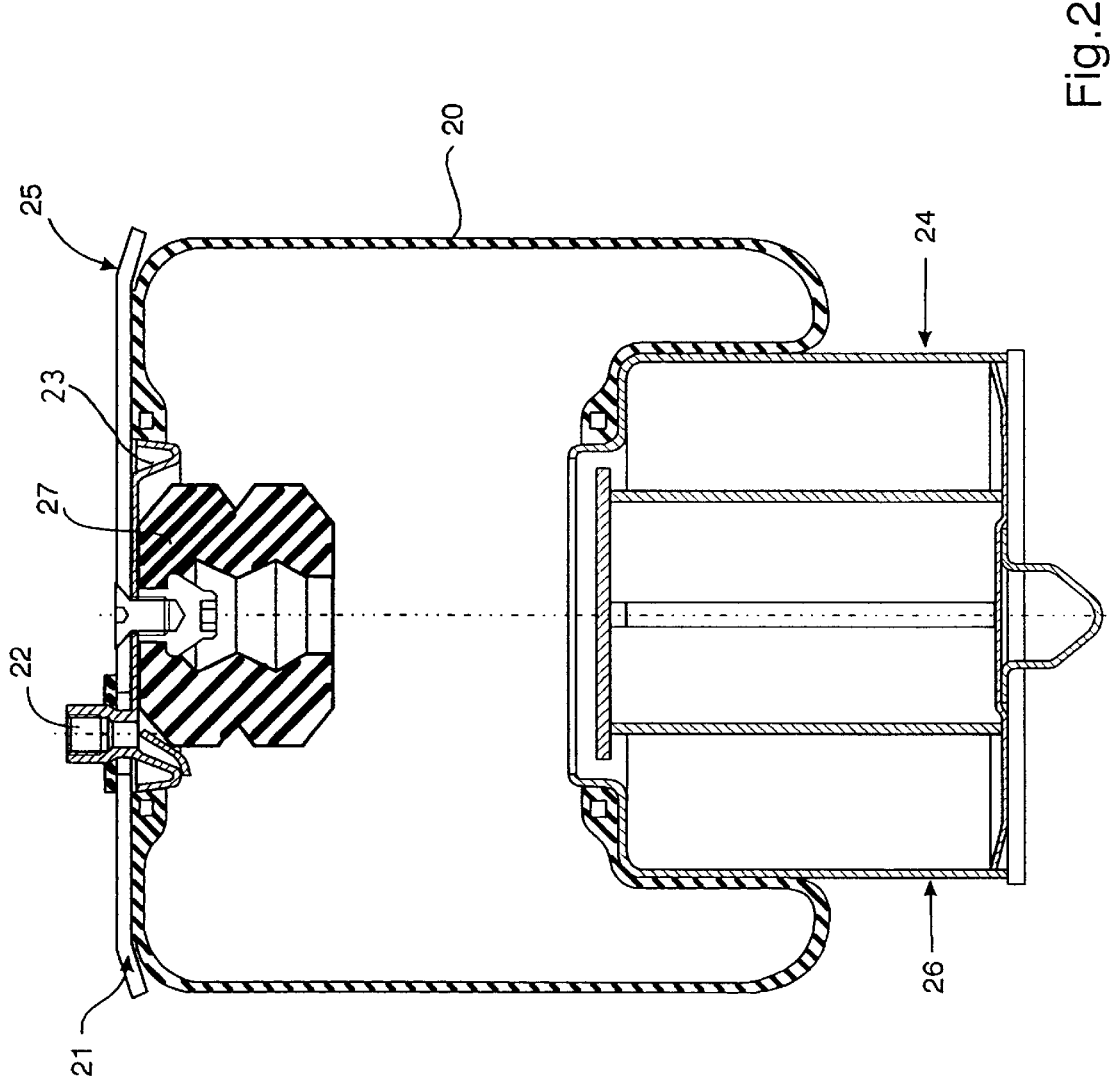
FIG. 2 is a side, elevational, sectional view of a pneumatic suspension means.

The vertical position of the wheel axle relative to the frame structure can be adjusted by means of height adjustment means. The height adjustment means consists of the pneumatic suspension, 17a and 18a, of the LCV. The pneumatic suspension will be described in greater detail below, in connection with FIG. 2.

Between the wheel axle 4 and the frame structure, distance measurement means 29 are arranged, measuring the distance between wheel axle and frame structure. The distance measurement means is described in greater detail below, in connection with FIG. 2.

The pneumatic suspension means, 17a, 17b, 18a and 18b, each comprise an air bellows 20, made of rubber. The air bellows defines a closed space, together with a bottom structure 24 and a top structure 25 affixed to the bellows. The top structure of the air bellows consists of a bead plate 23, threaded onto the top end of the air bellows and fixed to a bellows plate 21. The bottom structure 24 exhibits a cylindrical section 26. The air bellows is, except when it has attained its maximum extended position, partly rolled up onto the cylindrical section 26. The bellows is arranged to be rolled off the cylindrical section when the pneumatic suspension means is extended, and to be rolled up onto the cylindrical section when the pneumatic suspension means is compressed. The bottom structure 24 comprises a hollow body, which is provided to increase the total air content of the air bellows, thereby creating an air spring with enhanced spring characteristics.

Inside the air bellows there is provided a rubber spring cushion 27 for the purpose of absorbing the load and impacts should the air spring function deteriorate.

The total height of the air spring is controlled by filling the air bellows with, or draining the air bellows of, compressed air. For this purpose, the pneumatic spring is provided with a connection 22 to a pneumatic system arranged on the vehicle.

Figure 3:
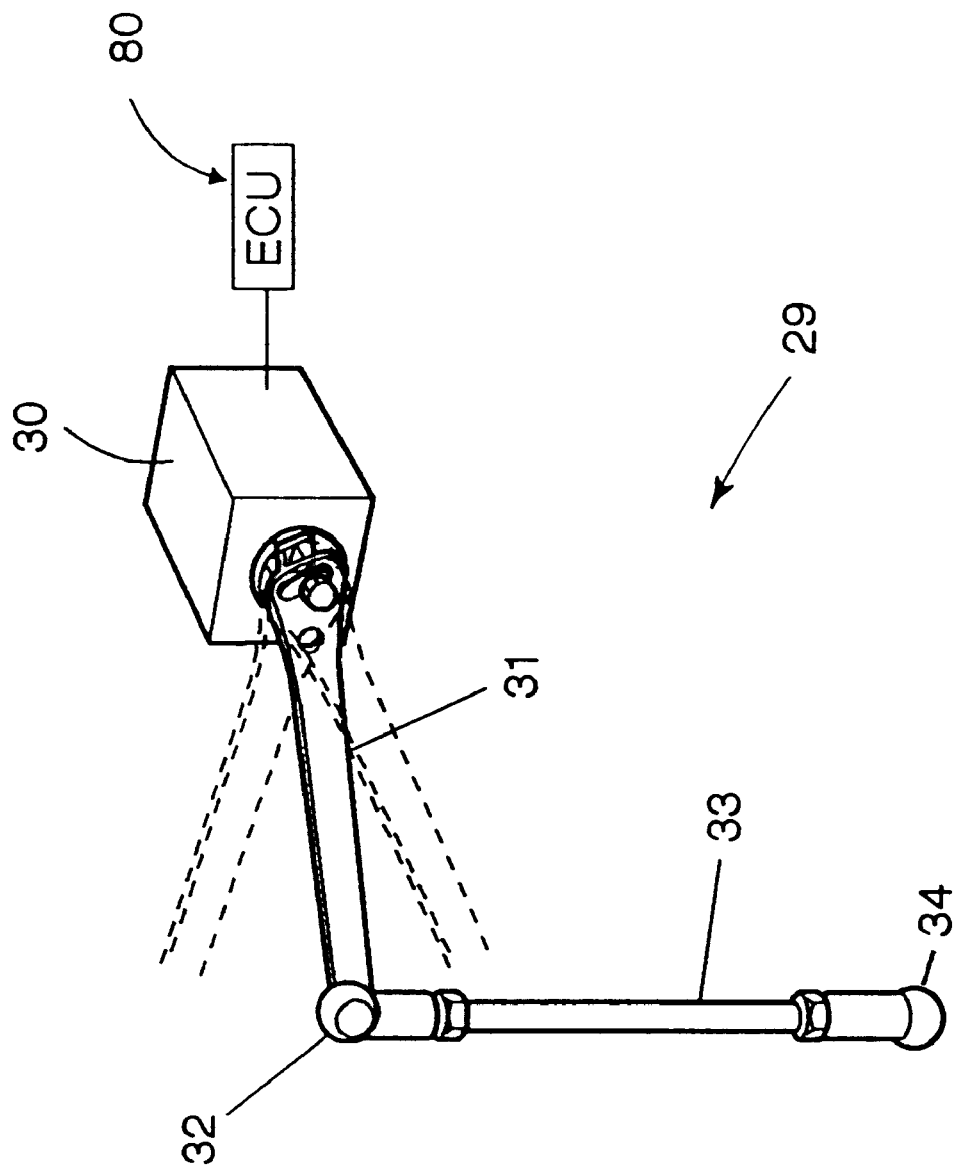
FIG. 3 is a side, perspective view of a measuring means for determining the distance between the wheel axle and the frame structure of a vehicle.

FIG. 3 shows a means 29 for measurement of the vehicle ride height, i.e. a height level sensor. This means comprises an angular position sensor 30, a lever connected to the angular position sensor, and a control rod 33 connected by a joint 32. The control rod 33 is in turn connected to the wheel axle 4 by means of a joint 34. When the pneumatic suspension is filled with or drained of compressed air, the elevation of the LCV frame structure is changed, pushing the control rod upwards or downwards, which in turn changes the angular position of the lever 31. The angular position of the lever is sensed by the angular position 30, whereby the distance between wheel axle and frame structure, and thereby the elevation of the vehicle, can be determined.

Figure 4:
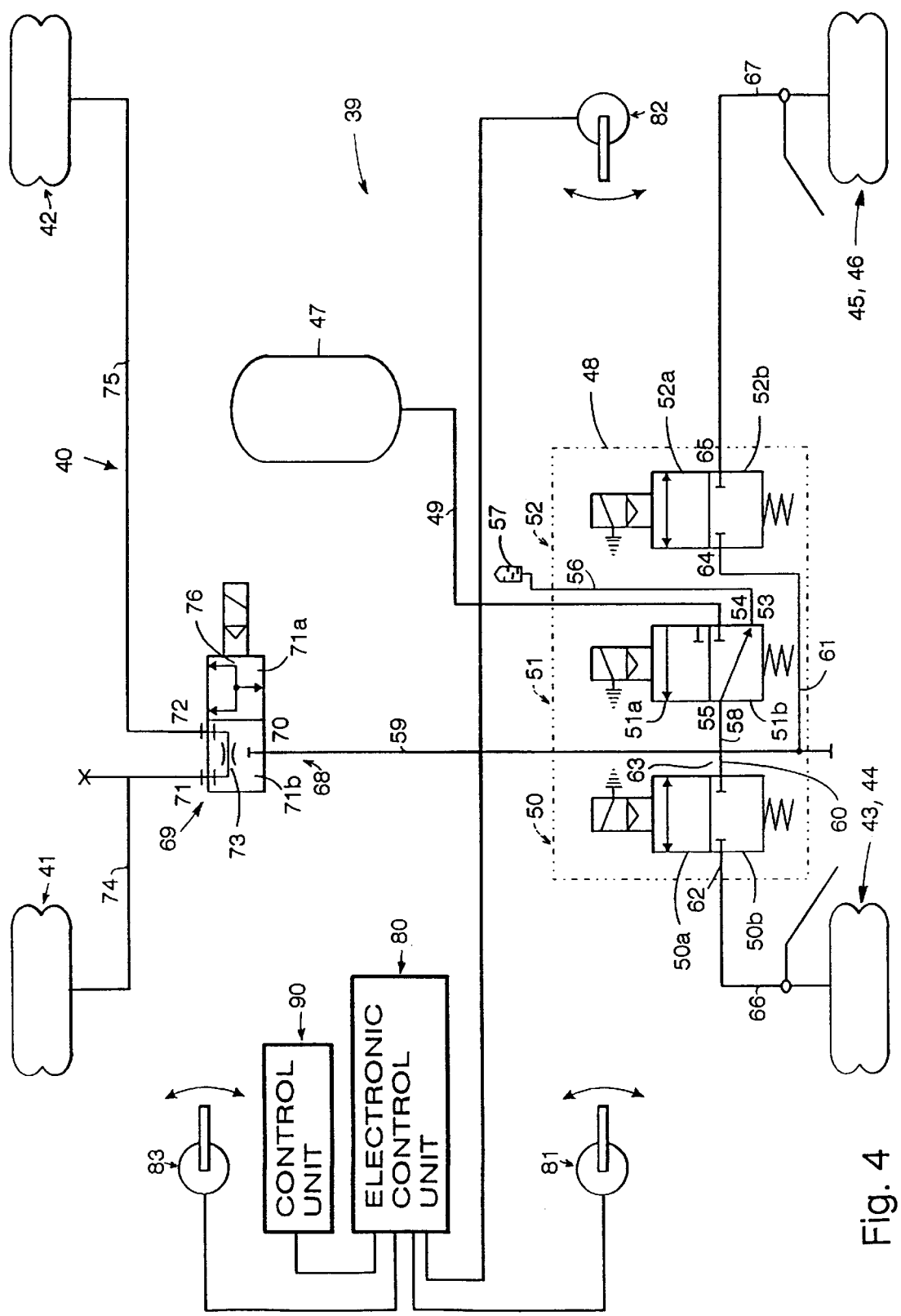
FIG. 4 is a circuit diagram of the vehicle's pneumatic system.

FIG. 4 shows, as a circuit diagram, the function of an apparatus 39 for adjusting the elevation of the vehicle frame structure. The apparatus substantially consists of a pneumatic system 40. An electronic control unit 80, a control unit 90, and height level sensors, 81, 82 and 83, are connected to the apparatus 39. The pneumatic system 40 controls the entry and exit of compressed air to the forward, 41 and 42, and the rear, 43, 44, 45 and 46, air bellows. The pneumatic system comprises a compressed air storage means 47 consisting of a number of compressed air reservoirs. The compressed air storage means 47 is connected to a first valve means 48 by means of a supply line 49. The first valve means comprises a first solenoid valve 50, a second solenoid valve 51, and a third solenoid valve 52.

The second solenoid valve 51 exhibits a first port 53, a second port 54, and a third port 55, to which lines are connected. A drain line 56 is connected to the first port 53. The drain line leads to the surrounding atmosphere through an air filter 57. The supply line 49 is connected to the second port 54. A first connection line 58 is connected to the third port 55, connecting the second solenoid valve 51 to a main line 59.

The first solenoid valve 50 is operable between a first position 50a and a second position 50b.

The second solenoid valve 51 is operable between a first position 51a and a second position 51b.

The third solenoid valve 52 is operable between a first position 52a and a second position 52b.

When the second solenoid valve 51 is set to its first position 51a, the second port 54 is connected to the third port 55 by an internal passage in the solenoid valve, whereby the main line 59 is connected to the supply line 49 by means of the first connection line 58. This means that compressed air can be fed from the compressed air storage means 47 to the main line 59. The first port of the second solenoid valve 51 is blocked when the solenoid valve is in this position, and therefore no compressed air is drained to the surrounding atmosphere.

When the second solenoid valve 51 is set to its second position 51b, the third port 55 is connected to the first port 53 by an internal passage in the solenoid valve, whereby the main line 59 is connected to the drain line 56. This means that compressed air from the main line 59 is released to the surrounding atmosphere through the drain line 56. The second port 54 of the second solenoid valve is blocked when the solenoid valve is in this position, and therefore no compressed air is allowed to enter the main line from the compressed air storage means 47.

The first solenoid valve 50 and the third solenoid valve 52 are connected to the main line 59 by a second connection line 60 and a third connection line 61. The first and the third solenoid valves are both designed with two ports, 62, 63, 64 and 65.

When the first solenoid valve 50 is set to its first position 50a, the first port of the first solenoid valve is connected to its second port by an internal passage, whereby an inlet line 66 is connected to the main line 59. Compressed air can then be fed from the main line to the inlet line, by means of an inlet, to the bellows, 43 and 44, if a higher pressure exists in the main line than in the bellows, 43 and 44, which is the case when the main line is in connection with the compressed air storage means 47. If the pressure in the main line is lower than in the bellows, 43 and 44, which is the case when the main line is in connection with the drain line 56, compressed air is transported from the bellows to the main line.

When the first solenoid valve 50 is set to its second position 50b, the first and the second ports of the first valve are blocked, whereby the bellows associated with the first valve are pneumatically isolated from the surroundings. This means that when the first valve is set to this position, compressed air can neither be fed into nor be drained out from the bellows.

When the third solenoid valve 52 is set to its first position 52a, the first port of the third solenoid valve is connected to its second port by an internal passage, whereby an inlet fine 67 is connected to the main line 59. Compressed air can then be fed from the main line to the inlet line, through an inlet to the bellows, 45 and 46, associated with the third solenoid valve, if a higher pressure exists in the main line than in the bellows, 45 and 46, which is the case when the main line is in connection with the compressed air storage means 47. If the pressure in the main line is lower than in the bellows, 45 and 46, which is the case when the main line is in connection with the drain line 56, compressed air is transported from the bellows to the main line.

When the third solenoid valve 52 is set to its second position 52b, the first and the second ports of the third valve are blocked, whereby the bellows associated with the third valve are pneumatically isolated from the surroundings. This means that when the third valve is set to this position, compressed air can neither be fed into nor be drained out from the bellows.

The main line 59 is provided besides the connections to the first solenoid valve and the second solenoid valve with a connection to a second valve means 68. The second valve means 68 controls the flow into and out from the forward air bellows, 41 and 42. The forward valve means may be arranged so as to allow separate supply to the left hand and right hand bellows. In that case, a set of at least two solenoid valves is needed. As the loading of the front axle is substantially symmetrical, it is sufficient for the valve means to allow simultaneous and identical compressed air supply to the forward bellows in the embodiment shown in FIG. 4. The second valve means consists of a fourth solenoid valve 69. The fourth solenoid valve comprises a first port 70, a second port 71, and a third port 72. The fourth solenoid valve is operable between a first position 71a, and a second position 71b.

When the fourth valve is set to its second position 71b, the second port 71 is connected to the third port 72 by an internal passage in the solenoid valve, which is provided with a restrictor 73. When the solenoid valve is set to this position, the two forward bellows, 41 and 42, communicate with each other by means of inlet lines, 74 and 75, and the internal passage in the fourth solenoid valve. The first port 70 of the fourth solenoid valve is blocked in this position, allowing compressed air neither to be fed into or to be drained out from the bellows.

When the fourth valve is set to its first position 71a, the first port 70 is connected to the second and third ports, 71 and 72, through internal passages 76 in the solenoid valve. When the solenoid valve is set to this position, the two forward bellows, 41 and 42, communicate with the main line 59 by means of inlet lines, 74 and 75, and the internal passages 76 in the solenoid valve. The first port of the fourth valve is open in this position, whereby air can flow into or out from the bellows in dependence of the setting of the first valve means 48.

The solenoid valves comprised in the first and second valve means are operable into their respective first and second positions by means of signals from a control device 80. The solenoid valves assume, in their non-actuated mode where no current is flowing through a solenoid arranged in each solenoid valve, their respective second positions. The solenoids are biased to this position by a mechanical spring included in each solenoid valve, which holds the solenoid valve in its second position. When a current flows through the solenoid arranged in each solenoid valve, a magnet core provided inside the solenoid compresses the mechanical spring, whereupon the solenoid valve assumes its first position.

Height level sensors, 81, 82 and 83, are connected to the control device 80, supplying said means with information about the position of each air bellows. Thereby, the elevation of the LCV may be determined. The control device then controls the position of each of the valve means, or solenoid valves, so as to set and maintain, respectively, the desired elevation of the vehicle. The control device comprises memory cells where limit values for a larger range, 20a and 20b, and a smaller range, 21a and 21b, are stored. Furthermore, a factory set default position 20c is also stored. The factory set position can be resumed by setting the control unit to a default position. The size of the larger range is determined in the case of the present invention being utilized for a vehicle having a pneumatic suspension substantially by the maximum stroke of the air bellows. The size of the smaller range is determined by that range within which the elevation can be maintained without causing damage to the vehicle when operated in the driving mode.

The number of devices for adjusting the loading platform elevation is preferably three. In the case of three elevation adjustment devices being used, they are preferably arranged in such a manner that one device controls the front end of the LCV, one controls the LCV rear left section, and one controls the LCV rear right section. In this manner, a level control can be achieved in such a way that the loading platform remains in a horizontal plane, even if the LCV is loaded with a load weighing more heavily on one side of the LCV.

Figure 5:
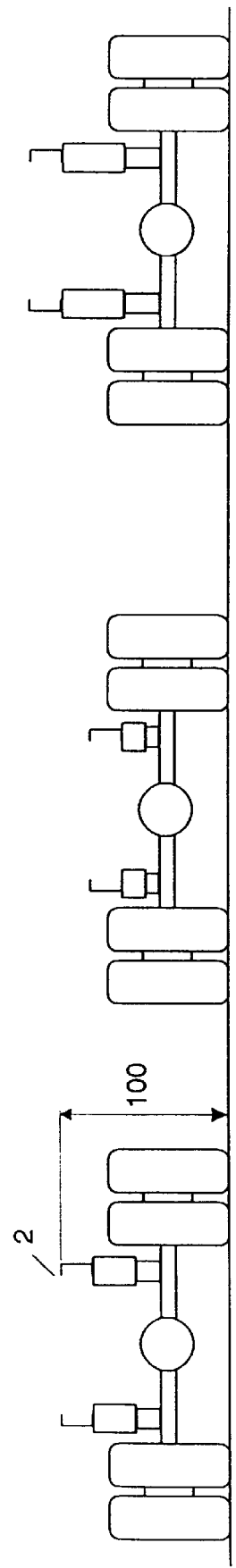
FIG. 5a is a schematic representation of the LCV with the elevation of the loading platform set into an intermediate position.
FIG. 5b is a schematic representation of the LCV with the elevation of the loading platform set into one extreme end position.
FIG. 5c is a schematic representation of the LCV with the elevation of the loading platform set into the other extreme end position.

FIGS. 5a to 5c show the LCV seen from behind, with the device for adjustment of the loading platform elevation set to one intermediate position and two extreme end positions. In FIG. 5a, the loading platform 2 assumes an intermediate position, from which it may be raised as well as lowered. In FIG. 5b, the device for adjustment of the loading platform elevation has been set for the loading platform to assume its absolutely lowest position. In this position there is no possibility of downwards resiliency by compression of the elevation adjustment device. This means that such an extreme position cannot be utilized when the LCV is in the driving mode, as the loading platform in this case is only resiliently suspended for movement towards a higher elevation of the loading platform. In FIG. 5c, the device for adjustment of the loading platform elevation has been set for the loading platform to assume its absolutely highest position. In this position there is no possibility of upwards resiliency by extension of the elevation adjustment device. This means that such an extreme position cannot be utilized when the LCV is in the driving mode, as the loading platform in this case is only resiliently suspended for movement towards a lower elevation of the loading platform.

The ride height 100 designates the distance from the load-carrying frame structure to the ground level 101.

Figure 6:
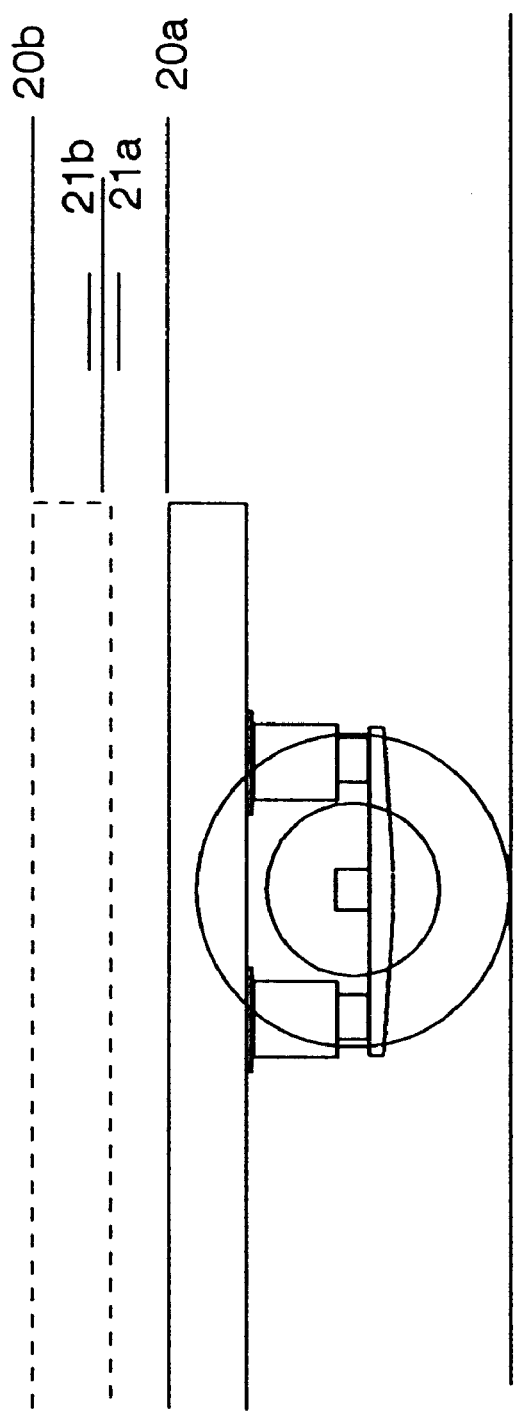
FIG. 6 is a schematic representation of the driving mode ride height range in relation to the parking and marshalling ride height range for the LCV.

FIG. 6 shows an example of within what ranges the elevation may be adjusted, when the vehicle is parked, or, alternatively, is marshalling, i.e. when the vehicle is conducted at a speed below about 10 to 20 km/h. When the vehicle is parked or being marshalled, the elevation may be adjusted between the lowest level 20a and the highest level 20b. The distance between these two levels is typically about 30 cm. This means that the loading platform may be adjusted between an elevation of about 75 cm above ground level and an elevation of about 105 cm above ground level.

When the control unit has assumed its driving mode. i.e. preferably when the vehicle is operated in the driving mode, i.e. when the vehicle is not parked, or is driven at a speed exceeding about 20 km/h, the elevation is adjustable between a lowest level 21*a* and a highest level 21*b*. The distance between these two levels is typically about 10 cm. This means that the loading platform may be adjusted between an elevation of about 80 cm above ground level and in elevation of about 90 cm above ground level.

Figure 7:
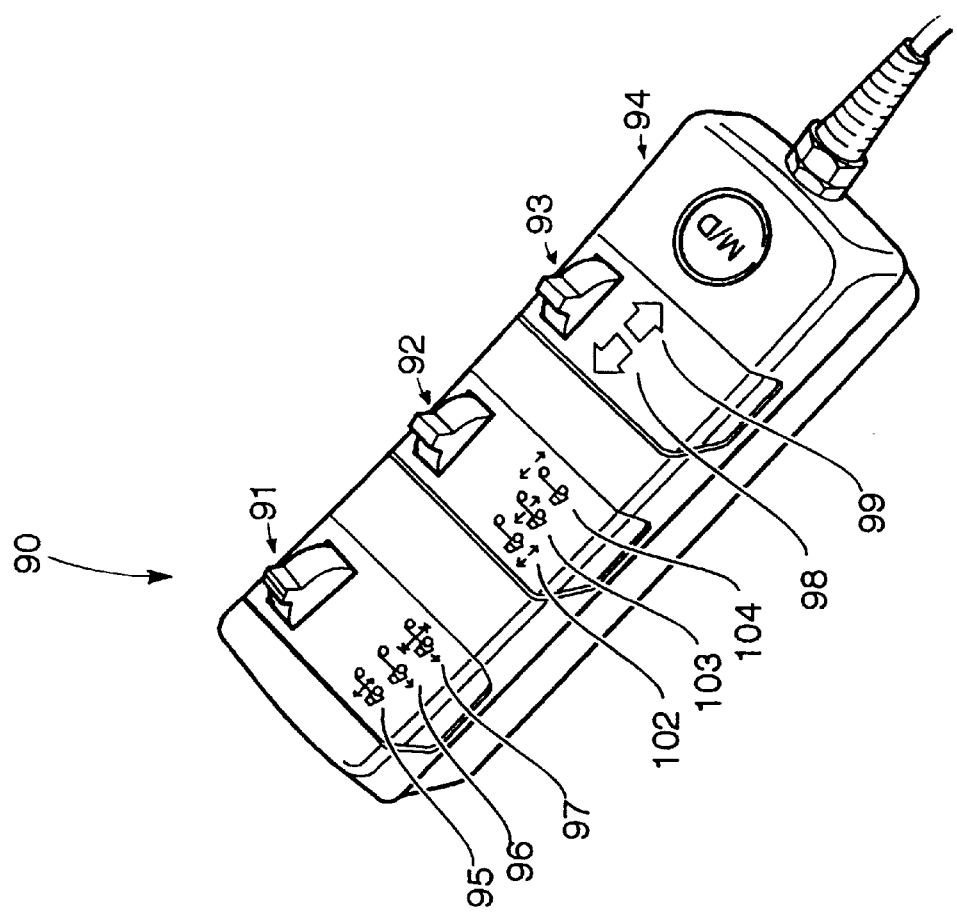
FIG. 7 is a front, perspective view of a control unit for control and setting of the distance between wheel axle and frame structure.

FIG. 7 shows a control unit 90 for operation and adjustment of the distance between wheel axle and frame structure. The control unit comprises means for adjustment of the size of the distance, and selector means for switching the control unit 80 into a driving mode or a parking/marshalling mode. The control unit 90 comprises a first switch 91, a second switch 92, a third switch 93, and a fourth switch 94.

The first switch can be switched between a first position 95, a second position 96, and a third position 97. When the switch is set to its first position 95, the elevation of the LCV loading platform is adjustable within the first larger range, 20*a* and 20*b*. This corresponds to the control unit being set to its parking or marshalling mode. When the switch is set to its second position 96, the control unit will assume its driving mode, and the vehicle will assume its preset ride height of the loading platform and the frame structure. When the switch is set to its third position 97, the ride height is adjustable within the second, smaller range, 21*a* and 21*b*.

The third switch 93 can be switched between a first position 98, a second position 99, and a neutral position. When the third switch 93 is set to its first position 98, the desired elevation is increased. When the third switch 93 is set to its second position 99, the desired elevation is decreased. When the third switch 93 is set to its neutral position, the first and the second valve means will assume such positions as to allow neither compressed air into or out from the pneumatic suspension means. This means that the first, the third and the fourth solenoid valves, 50, 52 and 69, are all set to their respective second positions, 50*b*, 52*b* and 71*b*.

The elevation adjustment, i.e. the setting of the desired height level of the loading platform, and of the size of the desired distance between the wheel axle and the frame structure, respectively, within the smaller range, when the control unit is set into its driving mode, as well as the larger range when the control unit is set into its parking or marshalling mode, is made by pushing the third switch from its neutral position to either its first position, thereby increasing the set elevation, or to its second position, thereby reducing the set elevation. When the elevation is increased, the second valve means is set to such a mode as to connect the compressed air supply to the main line 59. This means that the second solenoid valve 51 is set to its first position 51*a*. When the elevation is decreased, the second valve means is set to such a mode as to connect the main line 59 to the drain line. This means that the second solenoid valve 51 is set to its second position 51*b*.

The fourth switch 94 is used to change the control unit switches into other function modes, such as in order to allow resetting of the default, factory set ride height, to retrieve and program a number of preselected elevations when the control unit is set to its parking or marshalling mode.

The second switch 92 may selectively be set into a first position 102, a second position 103, or a third position 104.

When the second switch 92 is set to its first position 102, the first valve means 48, and the second valve means 68 are set in such a manner as to affect only the elevation setting of the front axle. This means that the first and the third solenoid valves, 50 and 52, are set to their respective second positions, 50*b* and 52*b*, whereas the fourth solenoid valve 69 is set to its first position 71*a*.

When the second switch 92 is set to its second position 103, the first valve means 48, and the second valve means 68 are set in such a manner as to affect the elevation adjustment of the front axle and the rear axle, or rear axles, simultaneously. This means that the first and the third solenoid valves, 50 and 52, are set to their respective first positions, 50*a* and 52*a*, and the fourth solenoid valve 69 is set to its first position 71*a*.

When the second switch 92 is set to its third position 104, the first valve means 48, and the second valve means 68 are set in such a manner as to affect only the elevation setting of the rear axle or axles. This means that the first and the third solenoid valves, 50 and 52, are set to their respective first positions, 50*a* and 52*a*, whereas the fourth solenoid valve 69 is set to its second position 71*b*.

The control unit 90 is in signalling connection with the control unit 80. The control unit 90 is detachably arranged in the cab 3 in order to allow for the control unit to be positioned inside or outside the cab 3.

The elevation adjustment is preferably performed when the vehicle is parked. Setting of the control device to a driving mode does not mean that the vehicle is operated in a driving mode at present. Setting the control device to a driving mode means that the elevation adjustment can be made within the range appropriate for operating the vehicle in a driving mode.

The reference "LCV" shall mean a trailer as well as a tractor vehicle.

The reference "ride height" shall mean the elevation above ground level that the loading platform of an LCV has assumed when the control unit is set to a driving mode.

The reference "marshalling" shall mean that the vehicle is driven at low speed.

The reference "operated in a driving mode" shall mean that the vehicle is driven at a speed exceeding a certain limit speed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised S without departing from the spirit and scope of the present invention as defined by the appended claims.

What is claimed is:

1. Apparatus for adjusting the height of a vehicle frame on a vehicle including a vehicle suspension system, said apparatus comprising vehicle frame elevation adjustment means for adjusting the elevation of said vehicle frame, and control means for controlling said vehicle frame elevation adjustment means, said control means adapted to be set in a first mode corresponding to normal driving of said vehicle and a second mode corresponding to parking or marshalling of said vehicle, whereby when said control means is in said first mode said vehicle frame elevation adjustment means permits adjustment of said vehicle frame within a first range and when said control means is in said second mode said vehicle frame elevation adjustment means permits adjustment of said vehicle frame within a second range, said first range being greater than said second range, and said second range being within said first range.

2. The apparatus of claim 1 wherein said vehicle frame elevation adjustment means comprises a pneumatic suspension system for said vehicle.

3. The apparatus of claim 2 wherein said vehicle includes at least one wheel axle, and said vehicle frame elevation adjustment means adjusts said elevation of said vehicle frame with respect to said at least one wheel axle.

4. The apparatus of claim 3 wherein said pneumatic suspension system is arranged between said vehicle frame and said at least one wheel axle, said control means including selector means for selecting one of said first and second modes, and said pneumatic suspension system including a source of compressed air, valve means for controllably feeding said compressed air to said pneumatic suspension system or draining said compressed air from said pneumatic suspension system in response to said control means, whereby said pneumatic suspension system is expanded or compressed in order to adjust the distance between said vehicle frame and said at least one wheel axle, said distance between said vehicle frame and said at least one wheel axle being adjusted within said first range when said control means is in said first mode and within said second range when said control means is in said second mode.

5. The apparatus of claim 4 including measuring means for measuring the distance between said vehicle frame and said at least one wheel axle.

6. The apparatus of claim 4 wherein said measuring means comprises an angular position sensor, a lever connected to said angular position sensor, and a control rod articulated with respect to said lever, said angular position sensor being attached to one of said vehicle frame and said at least one wheel axle and said control rod being attached to the other of said vehicle frame and said at least one wheel axle, whereby said angular position sensor measures the angular position of said lever so that when said distance between said vehicle frame and said at least one wheel axle is altered by means of said pneumatic suspension system the position of said control rod is altered, thereby altering the angular position of said lever sensed by said angular position sensor, said control means including means for reading said angular position of said lever and determining the distance between said vehicle frame and said at least one wheel axle based thereon.

7. The apparatus of claim 6 wherein said pneumatic suspension system includes air bellows comprising a flexible material, a base for said air bellows, and a top for said air bellows, said air bellows, said base and said top defining a closed space, and connection means connecting said valve means with said closed space, said pneumatic suspension system including a cylindrical surface, whereby said bellows is adapted to roll onto said cylindrical surface when said pneumatic suspension system is compressed and to roll off of said cylindrical surface when said pneumatic suspension system is extended.

8. The apparatus of claim 7 wherein said cylindrical surface is incorporated in said base, and said base is attached to said at least one wheel axle.

9. The apparatus of claim 8 wherein said cylindrical surface comprises a hollow body, whereby the volume of said closed space is increased.

10. The apparatus of claim 2 wherein the limits of said first range are defined by the maximum extension and compression of said pneumatic suspension system.

11. The apparatus of claim 1 including selector means connected to said control means, said selector means being manually settable between said first mode and said second mode.

12. The apparatus of claim 1, wherein said normal driving of said vehicle corresponds to driving said vehicle at a speed greater than about 20 km/h, said marshalling of said vehicle corresponds to driving said vehicle at a speed below about 20 km/h, and said parking of said vehicle corresponds to said vehicle at 0 km/h.

13. Apparatus for adjusting the distance between a vehicle frame and at least one wheel axle of a vehicle having a suspension system, said apparatus comprising a control unit including control members for setting a desired value for said distance, control means adapted to be set in a first mode and a second mode, and selector means for selecting one of said first and second modes for said control means whereby when said control means is in said first mode said desired value for said distance is within a first range and when said control means is in said second mode said desired value for said distance is within a second range, said first range being greater than said second range, and said second range being within said first range.

14. The apparatus of claim 13 wherein said vehicle includes a cab and wherein said control means is attachably mounted in said cab.

15. The apparatus of claim 13 wherein said first mode corresponds to normal driving of said vehicle and said second mode corresponds to parking or marshalling of said vehicle.

16. The apparatus of claim 13 wherein said selector means comprises a manual switch.

* * * * *

UNITED STATES PATENT AND TRADEMARK OFFICE
CERTIFICATE OF CORRECTION

PATENT NO.    : 6,431,557 B1
DATED         : August 13, 2002
INVENTOR(S)   : Bengt Terborn and Per-Olof Brandt It is certified that error appears in the above-identified patent and that said Letters Patent is hereby corrected as shown below:

<u>Column 12,</u>
Line 43, delete "S".

<u>Column 13,</u>
Line 22, delete "4" and insert therefor -- 5 --.

Signed and Sealed this

Fourth Day of February, 2003

JAMES E. ROGAN
*Director of the United States Patent and Trademark Office*